United States Patent [19]
Hoseney et al.

[11] Patent Number: 5,194,276
[45] Date of Patent: Mar. 16, 1993

[54] METHOD FOR RAPIDLY PRODUCING STABLE FLOUR FROM NEWLY HARVESTED WHEAT

[75] Inventors: R. Carl Hoseney; Jon M. Faubion; Kantha Shelke, all of Manhatten, Kans.

[73] Assignee: The Pillsbury Company, Minneapolis, Minn.

[21] Appl. No.: 771,341

[22] Filed: Oct. 4, 1991

[51] Int. Cl.$^5$ ............................................. A23L 1/00
[52] U.S. Cl. ................................. 426/242; 426/335; 426/507; 426/622
[58] Field of Search .............. 426/507, 335, 242, 549, 426/622

[56] References Cited

U.S. PATENT DOCUMENTS

| | | | |
|---|---|---|---|
| 2,898,270 | 8/1959 | Witt, Jr. et al. | 426/28 |
| 2,969,289 | 1/1961 | Matz | 426/549 |
| 3,558,327 | 1/1971 | Watkins | 426/241 |
| 3,620,764 | 11/1971 | Watkins | 426/241 |
| 4,016,656 | 4/1977 | Batscheider et al. | 34/12 |
| 4,107,341 | 8/1978 | Seiling | 426/549 |
| 4,299,854 | 11/1981 | Globe et al. | 426/335 |
| 4,350,709 | 9/1982 | Vidal et al. | 426/335 |
| 4,396,637 | 8/1983 | Singer | 426/549 |
| 4,898,092 | 2/1990 | Greer | 99/516 |
| 4,904,493 | 2/1990 | Petrizzelli | 426/549 |
| 4,994,286 | 2/1991 | Greer | 426/507 |

Primary Examiner—George Yeung
Attorney, Agent, or Firm—Merchant, Gould, Smith, Edell, Welter & Schmidt

[57] ABSTRACT

The invention is directed to a method for producing wheat flour from newly harvested wheat grain. The grain direct from harvest is treated with moisture to increase the moisture content of the endosperms to a level at least about 4 to 5 wt-% greater than the original level, thereby producing hydrated wheat grain. The hydrated wheat grain is then rapidly dried to a moisture content approximating the original level of the newly harvested wheat grain to produce grain that can be efficiently milled. The milling of the treated grain produces a wheat flour that is more acceptable and desirable for baking than that produced from newly harvested wheat that is not processed according to the invention. The rapid conversion of grain from the newly harvested state to a more millable state is shown by an increase in the capacity of the milled flour to rapidly hydrate. Newly harvested grain normally increases its hydration capacity over the first two to three months after its harvest. The method of the present invention permits elimination of this aging process yet produces a flour having desirable baking characteristics.

17 Claims, No Drawings

METHOD FOR RAPIDLY PRODUCING STABLE FLOUR FROM NEWLY HARVESTED WHEAT

BACKGROUND OF THE INVENTION

When newly harvested wheat is milled to flour without aging, the flour often does not produce an appropriate processing characteristics and product qualities for farinaceous baking compositions. Consequently, to establish consistent baking properties, newly harvested wheat is typically aged more than three months before it is milled. The aging process, however, not only requires significant storage capacity and inventory cost but also varies according to the growing and harvesting conditions for the wheat. Consequently, commercial millers and bakers seek methods to shorten the aging and account for the variation in the milling quality of newly harvested wheat. Usually these methods involve adjusting the added water content and other ingredients of farinaceous baking compositions based upon the characteristics of the newly harvested wheat. Nevertheless, the characteristics of baking compositions formulated in this fashion are difficult to manage and do not substantially remain constant for a particular harvest. For example, although the processing and baking characteristics of the flour are tested by the miller, by the time the flour is received by the baking plant, these characteristics oftentimes have changed. As a result, doughs, batters and baking compositions made with newly milled flours often have inappropriate rheologies and do not bake as desired, and the resulting baked products do not have appropriate product qualities. Due to these inconsistent characteristics of flour milled from newly harvested wheat, there must be periodic changes in mix formulations to provide doughs, batters and baked goods of acceptable quality. The commercial producer of farinaceous baked goods and baking compositions is faced with an expensive and cumbersome routine of revising formulations and processing conditions in order to compensate for variations and maintain high product quality. Such modifications are not only time-consuming but often are less than successful.

Therefore, an object of the invention is to develop a method to produce a flour of improved and consistent processability from newly harvested wheat grain. A further object is to rapidly convert newly harvested wheat grain into a flour with desirable baking characteristics. Yet another object is to develop a method for this conversion that is economical and can be adapted to commercial scale milling.

SUMMARY OF THE INVENTION

These and other goals are achieved by the present invention which is directed to a method for rapidly converting newly harvested wheat grain to wheat flour with desirable processing and product characteristics. The invention is as well directed to a process for making a baking composition from such wheat flour and the baking composition produced through use of such wheat flour.

The method calls for treatment of intact, newly harvested wheat grain with moisture for a sufficient time and under appropriate conditions to allow the endosperm of the grain to substantially equilibrate to a moisture content of at least about 4 to 5% more than the original moisture content of the newly harvested grain. Preferably, this moisture differential provides a hydrated grain having greater than about 20% moisture when the newly harvested grain has a moisture content of about 14 to 15%. The grain is then rapidly dried during a period of no more than about 24 hours to a moisture content approximating that originally present in the newly harvested grain. Preferably the dried moisture content is no more than about 15–16%. The treated grain is thereafter milled to produce a flour that displays desirable processing characteristics and final product quality when formulated into a farinaceous baking composition.

The present invention also provides a method for pretreating the intact newly harvested wheat grain prior to its milling such that the grain may be stored. The flour subsequently milled from the pretreated grain will have desirable processing and baking characteristics. This method includes the above-described steps for hydrating the endosperm and drying.

Either embodiment of the conversion method of the invention may further include storing the newly harvested wheat for 0 to 30 days prior to the moisture treatment step.

The process for making a baking composition with the wheat flour involves treatment of newly harvested wheat according to the foregoing method.

The baking composition of the invention incorporates flour produced according to the method of the invention and other ingredients found in a baking composition. These ingredients include water, leavening agent, sweetener such as sugar, fat, oil, egg, gums, starches, salt, flavoring and mixtures thereof.

DETAILED DESCRIPTION OF THE INVENTION

Newly harvested wheat grain is elastic and hydrophobic but upon aging converts to a brittle and hydrophilic state that produces a desirable flour. Although it is not to be regarded as a limitation of the invention, the differing baking characteristics of flours from newly harvested and aged wheat are believed to be related to variations in the macromolecular structure of the endosperm of the grain. In practical effect, milling unaged, newly harvested grain will not yield a flour that has desirable processing and baking characteristics such as a substantially constant water absorption, an appropriate rheology when combined with water, and desirable final product qualities when used in baking compositions. For the purposes of this invention, those processing characteristics and qualities include the repeated ability of the flour to provide batters and/or doughs having substantially the same rheology characteristics, color, water absorption capacity, mixing ability, texture and capacity to be processed by machines without loss of integrity. Also, for the purposes of this invention, those final product qualities include the product texture, crumb grain, size (large or small) and uniformness (or lack of it) of the baked product air cells, the interconnection or isolation of the air cells, the number of air cells per unit volume of the baked product and the overall increase in the volume of the baked product relative to its wet batter or dough volume.

Measurable properties of flour that relate to the variations in baking characteristics include the water absorption capacity of the flour. Newly harvested grain has a highly variable water absorption capacity which is believed to be related to the macromolecular endosperm structure. Thus, milling such newly harvested grain to flour does not yield a stable, uniform flour. The newly harvested grain exhibits poor milling and the resulting flour exhibits the foregoing poor processing and product characteristics when incorporated into farinaceous baking compositions. In particular, the variation in water absorption capacity of flour from newly harvested grain has been correlated with the variable quality of the wheat flour, as well as the variable quality of the batters, doughs and subsequent baked goods that contain those flours.

The outer layers of the wheat kernel, such as the seed coat, cross and tube cells and other nonendosperm parts, absorb water readily whereas the starchy endosperm, is hard, dense, vitreous, more hydrophobic and only slowly absorbs water. During the milling process, the outer layers are removed from the wheat kernel and the endosperm is reduced to flour. The endosperm is thus converted to small particles which make up the flour. It has been discovered that these particles exhibit a varying ability to hydrate depending upon their production from newly harvested or aged wheat grain and their own aging after milling. The ability of such particles to hydrate as a function of their age plots as an ascending curve that eventually reaches a constant value. This variable ability to hydrate is believed to be present even though the actual moisture content of the particles relative to that of the newly harvested or aged wheat grain has not significantly changed.

The present method substantially eliminates the relation between age and the increasing ability of the flour particles to hydrate. Once the ability of the flour particles to hydrate has plateaued, the flour will yield desirable processing and product characteristics such as rheology control and desirable product volume, texture, crumb grain and the like. Pursuant to the parameters given above, the present method rapidly converts wheat grain to a state that produces desirable farinaceous baking compositions. The hydration ability of the so converted flour as a function of its age essentially plots as a horizontal, straight line. As such, the method helps eliminate variations in the properties and performance of wheat flour and the quality of food products made from that flour which would otherwise occur as a result of the character of newly-harvested wheat grain.

The present invention involves a method for producing refined newly harvested wheat flour which has a substantially constant water absorption capacity. According to the method of the invention, the wheat grain, including the endosperm component, is treated with water to cause hydration and then rapidly dried to decrease its moisture content. To accomplish this method, the intact wheat grain is contacted with sufficient water to cause the moisture content of the outer layers to increase at least about 4 to 5 wt-% relative to the original value. Preferably, the outer layers reach a moisture content of about 20% or more by weight relative to the total weight of the grain when the original value is about 14 to 15 wt-%. The hydration is continued by maintaining the moistened intact wheat grain under moist conditions for a sufficient time to facilitate hydration of the endosperm by diffusion of the water from the outer layers, preferably for about 12 to 24 hours or a time period sufficient for water to permeate into the endosperm. Thus, the moisture content of the wheat kernel is rendered substantially equal throughout. Although the hydration of the outer layers and the endosperm can be conducted in two steps, it is preferably accomplished in a single step by maintaining the intact wheat grain under moist conditions for a sufficient time to hydrate the endosperm to a moisture level at least about 4 to 5 wt-% higher than its original value. Preferably the endosperm moisture level is about 20% or more by weight when the original value is about 14 to 15 wt-%. The hydrated wheat grain is then dried approximately to its original moisture level, preferably to less than about a 16 wt-% moisture content.

Although not meant to be a limitation of the invention, it is believed that the steps of the method of the invention cause a physical rearrangement of the endosperm such that microfissures and microcracks in the endosperm. The resulting fractures provide capillary routes and added surface area for water penetration within the endosperm so that, unlike untreated wheat, the endosperm of the treated wheat grain rapidly is able to absorb water and to convert to a millable state. The resulting flour likewise rapidly reaches the desirable characteristics for baking compositions. Thus, the method of the invention rapidly achieves substantially constant, desirable wheat flour characteristics such as the rheology and qualitative product properties.

To hydrate the wheat and endosperm, moisture may be applied to the intact wheat grain, for example, by placing the grain in an aqueous solution or a water-saturated atmosphere, by water spray application on a conveyor, or by other moisture applying methods such as overlaying with a moisture laden coat, covering or other material. The moisture laden grain is then maintained under conditions to prevent water evaporation for about 6 to 48 hours. It is preferred that the temperature of the environment surrounding the wheat grain is about 0° to 60° C., more preferably about 25° to 45° C., during this hydration period. The hydration period is sufficient to allow the applied moisture to penetrate the endosperm such that the moisture content substantially equilibrates throughout the grain. The wheat may then be dried for about 6 to 24 hours, for example, by microwaving, freeze-drying, or air drying at ambient temperature up to about 60° to 70° C. under low or no humidity, and with or without the addition of air convection to aid in the drying process.

Wheat grain of moisture content greater than 20% will deteriorate due to the presence of mold spores and bacteria within the outer layers of the grain. To substantially prevent or eliminate this phenomenon during the treatment process of this invention, antibacterial and/or antifungal agents may be added to the hydrating water or otherwise applied to the wheat in an amount effective to substantially inhibit bacterial and/or fungal growth during the hydration and saturation period. Examples of such agents include hystatin, mycostatin, and streptomycin.

In another embodiment of the invention, the wheat in a hydrated state (i.e., a water content of at least about 20 wt percent) may be frozen for a period of time and then thawed to stress and produce microfissures in the endosperm.

In the following examples, soft and hard wheats are treated to stabilize the water absorption capacity of the resultant flour from time of milling. For the examples given below, the moisture content of the soft wheat sample is about 12.5%, and the hard wheat sample is about 12.8% moisture level.

EXAMPLE 1

Saturation of Wheat by Soaking

The soft or hard wheat samples can be divided into a 1 Kg. control sample and a 1 Kg. test (treated) sample. The test samples may be added to separate containers with about 215 ml of tap water each, and agitated at ambient temperature (about 15° C.) until the moisture content of the hydrated wheat grain is about 30%.

The water may then be drained and the test samples may be spread in a thin layer in a low-walled pan to be dried. Air of about 65° C. and about 5% humidity may be convected over the wheat samples for an about 10 hour period. The dried test samples should have a moisture content of about 15% by weight, when the control wheat sample has about a 15% by weight moisture level. The control wheat sample is tempered by exposing it to just enough water to raise its moisture content to 15% by weight and holding it at that moisture content for about 10 to 12 hours immediately prior to milling.

EXAMPLE 2

Saturation of Wheat by Water Spray

Soft and hard wheat samples can be divided into a 1 Kg. control sample and a 1 Kg. test sample The test hard and soft wheat samples may be placed separately on a conveyer belt and sprayed with a fine mist of water (215 ml) at ambient temperature (about 15° C.) and then held under closed conditions for a time sufficient (about 16 to 24 hours) to increase the moisture content of the hydrated wheat to about 30% for the soft and hard wheat grain.

The test samples can then be dried on a conveyer belt according to the drying method of Example 1. For the soft wheat, the dried test sample appropriately may have a moisture content of about 15%, when the control sample, tempered as described in Example 1, has about a 15% by weight moisture level. For the hard wheat, the moisture content appropriately may be about 15.5% for the dried test sample, when the control sample, tempered as described in Example 1, has about a 16% by weight moisture content.

EXAMPLE 3

Saturation of Wheat by Water-Saturated Atmosphere

Soft and hard wheat samples can be divided into a 1 Kg. control sample and a 1 Kg. test sample. The test samples may be separately placed into an apparatus designed to turn over and stir the grain, maintain the grain as a moderately thin (10 to 20 cm) layer and maintain a water (63 ml) saturated atmosphere at an ambient temperature (about 15° C.)over the grain layer. The grain is stirred under the moisture saturated atmosphere until the moisture content of the hydrated wheat is about 20% by weight relative to the total weight of the grain (approximately 24 to 48 hours).

The test samples can then be removed from the receptacles and dried as described in Example 1. For the soft wheat, the dried test sample should have a moisture content of about 15%, when the control sample, tempered as described in Example 1, has a moisture content of about 15% by weight. For the hard wheat, the moisture content should have about 15.5% for the dried test sample, when the hard wheat control sample, tempered as described in Example 1, has a moisture content of about 16% by weight.

EXAMPLE 4

Preparation of Cakes and Breads Using Treated and Untreated Wheat Flour

Cakes and breads may be prepared to compare control flours to the test flours from Examples 1-3 above, according to the following procedures.

Flour Production and Water Absorption Testing

Soft and hard wheat control samples and each of the test soft and hard wheat samples from Examples 1-3 may be separately milled to produce refined flour. The flours can be separately stored in polyethylene bags at ambient temperature (25±3° C.) and relative humidity. The hydration capacity of the test and tempered control flours can be measured at regular intervals over a fourteen day period, as for example on days 0 (at milling), 1, 2, 5, 8, 11 and 14. To measure the hydration capacity of the control and test flours, an about 10 g aliquot of the flour sample can be wetted with about 100 ml distilled water for about 30 minutes, centrifuged (2000 × g, 10 minutes), decanted and weighed. The moisture absorption may be reported as the weight of distilled water absorbed by 10 g (14.0% moisture basis) of the flour sample.

For both soft and hard wheats, the hydration capacity of the tempered control flours varies such that the flour will have a nonuniform appearance and an nonstabilized capacity to take on water. Thus after several days, the control flour will make a dough or batter of differing rheology relative to the dough or batter made immediately after milling. By contrast, the flour prepared according to the invention will have an improved and substantially consistent capacity to take on water.

The Cake and Bread Baking with Control and Test Flours

The cake-baking quality and batter properties of control and test soft wheat flours, and the bread-baking quality and dough properties of control and test hard wheat flours from each milling may be evaluated at the above-indicated intervals during the 14-day test period.

Soft Wheat Flours

Refined layer cakes (8 inch) may be baked using AACC Method 10-90 (Amer. Assoc. of Cereal Chemists, AACC Method 10-90 in Approved Methods of the A.A.C.C., The Association: St. Paul, Minn. (1983), the disclosure of which is incorporated by reference herein).

The specific gravities of the cake batters should be reported as the ratio of the weight of batter to the weight of water of identical volume. For control flours, the batter specific gravity of the soft wheat control flour will be highest immediately after milling but decrease to a substantially constant level for the remainder of the test period. Batter rheology of the control flours will be low immediately after milling and increase steadily to a substantially constant level.

The volume, weight, and specific volume (volume/weight) of the cakes may be determined. The AACC cake template may be used to determine uniformity and symmetry indices. Cakes baked with freshly milled control soft wheat flours will be collapsed and unsymmetrical with a gummy undercrust. The cake volume index and symmetry of the control cakes will increase significantly with time after milling, reaching a substantially constant volume level.

Batters and cakes made from each of the test soft wheat flours will be of consistently higher quality from the time of milling throughout the entire test period.

Hard Wheat Flours

Bread loaves may be produced by an optimized straight-dough bread baking method (90 minute fermentation, AACC method 10-10B (Amer. Assoc. of Cereal Chemists, Approved Methods of the A.A.C.C. (1985), the disclosure of which is incorporated by reference herein).

External and internal characteristics of the loaves baked with control hard wheat flours will improve over the 14-day test period. The freshly milled control flours will produce bread of poor to moderate quality with lower volumes, conspicuous open cell structure, and under-oxidized characteristics. Over the 14-day test period, loaf volume will increase and internal and external loaf characteristics will improve.

The properties and characteristics of doughs and breads made from each of the test hard wheat flours of Examples 1-3 will be of consistently higher quality from the time of milling throughout the entire test period.

The invention has been described with reference to various specific and preferred embodiments and techniques. However, it should be understood that many variations and modifications may be made while remaining within the spirit and scope of the invention.

WHAT IS CLAIMED IS:

1. A method for rapidly converting newly harvested wheat grain to millable grain, comprising:
   treating the newly harvested wheat grain with moisture at a temperature of about 0° to 60° C. until the moisture content of the newly harvested wheat grain including the endosperm is at least about 4 to 5 wt-% higher than its original moisture content, to produce hydrated grain; and
   rapidly drying the hydrated grain to produce the millable grain;
   the weight percents being relative to the total weight of the grain.

2. A method according to claim 1, wherein the newly harvested wheat grain is composed of outer layers and endosperm and the treating step causes moisture content of the endosperm to substantially equilibrate to at least about 4 to 5 wt-% higher than the original moisture content of the endosperm.

3. A method according to claim 1, wherein the newly harvested wheat grain is treated with moisture and maintained under closed conditions for a period of up to about 24 hours.

4. A method according to claim 1, wherein the drying step comprises drying the hydrated grain to a moisture content approximately the same as the original moisture content of the newly harvested wheat grain.

5. A method according to claim 1, wherein the treatment step includes placing the newly harvested wheat grain in an aqueous solution, in a water-saturated atmosphere, or under a water spray.

6. A method according to claim 1, wherein the hydrated grain is dried by microwaving, freeze-drying, or air drying.

7. A method according to claim 6, wherein the hydrated grain is air dried at about ambient temperature of 23° C. to about 60° C., under low or no humidity.

8. A method according to claim 1, wherein the moisture treatment step includes application of an antifungal agent, an antibacterial agent or a combination thereof to the wheat grain.

9. A method according claim 8 wherein the antifungal agent, antibacterial agent, or combination thereof is consumable.

10. A method according to claim 1 wherein the hydrated grain is rapidly dried during a period of no more than about 24 hours.

11. A method according to claim 1 wherein the original moisture content is about 14 to 15 wt-%, the moisture content of the hydrated grain is at least about 20 wt-% and the moisture content of the millable grain is no more than about 16 wt-%.

12. A method for rapidly converting newly harvested wheat grain to a flour that will produce a farinaceous composition with substantially constant rheology and water absorption capacity, comprising:
    treating the newly harvested wheat grain with moisture at a temperature of about 0° to 60° C. until moisture content of the newly harvested wheat grain including the endosperm is at least about 4 to 5 wt-% higher than its original moisture content, to produce hydrated grain;
    rapidly drying the hydrated grain to produce a millable grain; and
    milling the millable grain to produce the flour, of the grain.

13. A method according to claim 12, wherein the newly harvested wheat grain is treated with moisture and maintained under closed conditions for a period of up to about 24 hours.

14. A method according to claim 12, wherein the newly harvested wheat grain is composed of outer layers and endosperm and the treating step causes moisture content of the endosperm to substantially equilibrate to a moisture content at least about 4 to 5 wt-% greater than the original moisture content of the endosperm.

15. A method according to claim 12, wherein the rapid drying step comprises drying the hydrated grain to a moisture content approximating the original moisture content of the newly harvested wheat grain.

16. A process for making a farinaceous baking composition comprising:
    treating newly harvested wheat grain with moisture at a temperature of about 0 to 60° C. until the moisture content of the newly harvested wheat grain including the endosperm is at least about 4 to 5 wt-% higher than its original moisture content, to produce hydrated grain;
    rapidly drying the hydrated grain to produce millable grain;
    milling the millable grain to produce a flour; and,
    combining the flour with at least water to produce a farinaceous baking composition,
    the weight percents being relative to the total weight of the grain.

17. A process according to claim 16 further comprising combining the flour and water with an ingredient selected from the group consisting of a leavening agent, a sweetener, sugar, fat, oil, egg, gums, starches, flavoring and any mixture of such ingredients.

* * * * *

UNITED STATES PATENT AND TRADEMARK OFFICE
CERTIFICATE OF CORRECTION

PATENT NO. : 5,194,276
DATED : March 16, 1993
INVENTOR(S) : Hoseney et al.

It is certified that error appears in the above-identified patent and that said Letters Patent is hereby corrected as shown below:

At Column 4, line 12, please delete "that" and insert therefor --as--.

At Column 5, line 14, please delete "an about" and insert therefor --about a--.

At Column 6, line 22, please delete "an about" and insert therefor --about a--; and at line 67, please delete "control" and insert therefor --controlled--.

At Column 7, lines 1, 16 and 17, please delete "control" and insert therefor --controlled--.

At Column 8, line 31 and 32, please delete ", of the grain" and insert therefor --the weight percents being relative to the total weight of the grains.--.

Signed and Sealed this

Twelfth Day of September, 1995

Attest:

BRUCE LEHMAN

*Attesting Officer*       *Commissioner of Patents and Trademarks*